(12) United States Patent
Mobaraki

(10) Patent No.: US 10,473,089 B2
(45) Date of Patent: Nov. 12, 2019

(54) VERTICAL AXIS WIND TURBINE

(71) Applicant: Ali Mobaraki, Dehgolan (IR)

(72) Inventor: Ali Mobaraki, Dehgolan (IR)

( * ) Notice: Subject to any disclaimer, the term of this patent is extended or adjusted under 35 U.S.C. 154(b) by 65 days.

(21) Appl. No.: 15/915,039

(22) Filed: Mar. 7, 2018

(65) Prior Publication Data
US 2018/0195494 A1 Jul. 12, 2018

Related U.S. Application Data

(63) Continuation-in-part of application No. PCT/IB2016/054965, filed on Aug. 19, 2016.

(51) Int. Cl.
*F03D 3/00* (2006.01)
*F03D 3/06* (2006.01)
*F03D 7/04* (2006.01)
*F03D 7/06* (2006.01)

(52) U.S. Cl.
CPC ............. *F03D 7/041* (2013.01); *F03D 3/005* (2013.01); *F03D 3/062* (2013.01); *F03D 7/06* (2013.01); *F05B 2240/218* (2013.01); *F05B 2260/403* (2013.01); *F05B 2260/406* (2013.01); *F05B 2260/74* (2013.01); *Y02E 10/74* (2013.01)

(58) Field of Classification Search
CPC . F03D 3/005; F03D 3/062; F03D 7/06; F03D 7/041; F05B 2240/218; F05B 2260/403; F05B 2260/406; F05B 2260/74; Y02E 10/74
See application file for complete search history.

(56) References Cited

U.S. PATENT DOCUMENTS

| | | | | |
|---|---|---|---|---|
| 665,891 A | * | 1/1901 | Fetty | F03D 3/00 416/117 |
| 4,113,408 A | * | 9/1978 | Wurtz | F03D 3/068 416/117 |
| 4,134,710 A | * | 1/1979 | Atherton | F03B 17/065 290/53 |
| 4,142,832 A | * | 3/1979 | Clifton | F03D 3/067 416/117 |

(Continued)

FOREIGN PATENT DOCUMENTS

EP 0046122 A2 2/1982

OTHER PUBLICATIONS

International Search Report and Written Opinion dated Nov. 30, 2016 by the International Searching Authority (Indian Patent Office) in PCT Application PCT/IB2016/054965.

*Primary Examiner* — Igor Kershteyn
(74) *Attorney, Agent, or Firm* — NovoTechIP International PLLC

(57) ABSTRACT

A vertical axis turbine is disclosed, having a vertically oriented rotor shaft, a plurality of radially extended arms rotatably mounted on the rotor shaft, and a chassis at the distal end of each. For each chassis, an upper blade set is on an upper portion, having upper blade panels interconnected pivotally by upper guide links, and a lower blade set is on a lower portion, having lower blade panels interconnected pivotally by lower guide links. Each chassis has an upper shaft with an upper gear, coupled to the upper guide links, and a lower shaft with a lower gear coupled to the lower guide links. The upper gear and the lower gear mesh, limiting rotation of the upper shaft and lower shaft to opposite directions with similar rotational speeds.

15 Claims, 11 Drawing Sheets

(56) References Cited

U.S. PATENT DOCUMENTS

| | | | | |
|---|---|---|---|---|
| 5,256,034 | A | * | 10/1993 | Sultzbaugh ............ F03D 3/061 |
| | | | | 415/914 |
| 5,525,037 | A | * | 6/1996 | Cummings ............ F03D 3/067 |
| | | | | 416/117 |
| 6,320,273 | B1 | | 11/2001 | Nemec |
| 6,734,576 | B2 | * | 5/2004 | Pacheco ................ B63H 13/00 |
| | | | | 290/55 |
| 7,088,012 | B2 | | 8/2006 | Gizara |
| 8,016,544 | B1 | * | 9/2011 | Nguyen ................ F03D 3/067 |
| | | | | 415/130 |
| 8,602,719 | B2 | * | 12/2013 | Kelly .................... F03D 3/068 |
| | | | | 415/4.2 |
| 8,714,925 | B2 | | 5/2014 | Kamen et al. |
| 2009/0035134 | A1 | * | 2/2009 | Kuo ...................... F03D 3/068 |
| | | | | 416/119 |

* cited by examiner

VERTICAL AXIS WIND TURBINE

CROSS-REFERENCE TO RELATED APPLICATION

This application claims the benefit of priority from international Application No. PCT/IB2016/054965, filed Aug. 19, 2016, and entitled "THE ROTOR OF VERTICAL AXIS TURBINES WITH CONTROLLABLE SCISSORS-LIKE ROTATING PLATES," which is incorporated herein by reference in its entirety.

SPONSORSHIP STATEMENT

This application has been sponsored by University of Kurdistan, which does not have any rights in this application.

TECHNICAL FIELD

The present disclosure generally relates to wind turbines and particularly to vertical axis wind turbines.

BACKGROUND

Wind turbines are generally classified into horizontal axis wind turbines and vertical axis wind turbines based on the layout of the rotor and blades. In a horizontal axis wind turbine, the blades are designed such that a propelling force is generated when wind flows toward the blades and as a result, blades rotate around a horizontal axis. The blades of the horizontal axis wind turbines are generally very long. The rotor and electrical generator of the horizontal axis wind turbines need to be supported on a very tall mounting tower, which may pose disadvantages in cost for installation and maintenance. Furthermore, the rotor of a horizontal axis wind turbine must be pointed into the wind. Small horizontal axis wind turbines may be pointed into the wind by a simple wind vane, while large wind turbines generally use a wind sensor coupled with an electric motor. This requirement for aiming the turbine into an incident wind direction may add to the complexity of a horizontal axis wind turbine design.

In a vertical axis wind turbine, the blades are designed such that when wind flows toward the blades, a propelling force is generated and causes the blades to rotate around a vertical axis. The rotor shaft in a vertical axis wind turbine is vertically arranged and as a result there is no need to point the turbine into the wind. This is especially advantageous on sites where the wind direction is highly variable. In vertical axis wind turbines, the electric generator and the gear box may be placed near the ground, which improves the accessibility for maintenance. A vertical axis wind turbine can be simple to design and can have low construction costs, however it has relatively low efficiency. Furthermore, the key disadvantages of a vertical axis wind turbine may include but are not limited to a relatively low rotational speed with the consequential higher torque, an inherently lower power coefficient, and a pulsating torque generated by some blade designs.

There is a need in the art for wind turbines that may address some of the above mentioned drawbacks of both vertical axis and horizontal axis wind turbines.

SUMMARY

In one general aspect, a vertical axis turbine is disclosed that can include a vertically oriented rotor shaft and a plurality of radially extended arms that may be rotatably mounted on the vertically oriented rotor shaft. Each radially extended arm may include a chassis attached to the distal end thereof. An upper blade set may be mounted on an upper portion of the chassis, and the upper blade set may include a plurality of upper blade panels. Each of the plurality of upper blade panels may be pivotally mounted on the chassis from an upper panel first edge and may be rotatable between a closed position and an open position around a pivotal axis defined by the upper panel first edge. The plurality of the upper blade panels can be interconnected pivotally from an upper panel second edge by upper guide links. In an aspect, the upper guide links can be two parallel upper guide links. The vertical axis turbine may further include a lower blade set mounted on a lower portion of the chassis and the lower blade set may include a plurality of lower blade panels. Each of the plurality of lower blade panels may be pivotally mounted on the chassis from a lower panel first edge and it may be rotatable between a closed position and an open position around a pivotal axis defined by the lower panel first edge. The plurality of the lower blade panels may be interconnected pivotally from a lower panel second edge by lower guide links. In an aspect, the lower guide links can be two parallel lower guide links. An upper shaft may be coupled with the upper guide links via upper links attached to either ends of the upper shaft such that movement of the upper guide links rotates the upper shaft. The upper shaft can include an upper gear mounted thereon and rotatable therewith. In an aspect, a lower shaft may be coupled with the lower guide links via two lower links to either ends of the lower shaft such that movement of the lower guide links rotates the lower shaft. The lower shaft can include a lower gear mounted thereon and rotatable therewith. The upper gear and the lower gear may mesh with one another such that the upper shaft and the lower shaft are limited to rotational movements in opposite directions with similar rotational speeds.

According to some implementations, the vertical axis turbine can further include a first hydraulic jack that has a first piston disposed inside a cylinder, and the cylinder may have an inlet path and a discharge path. The vertical axis turbine may further include a first rack interposed meshably between the upper gear and the lower gear, in a configuration such that rotational movements of the upper gear and the lower gear transform into back and forth translational movements of the first rack, the first rack coupled with the first piston. The discharge path may be intercepted by a control valve that is configured to control an amount of hydraulic oil discharged from the first hydraulic jack.

According to some implementations, the control valve may include an interior compartment rotatably coupled with the upper shaft including a first plurality of holes, and an exterior compartment rotatably coupled with a set gear, the exterior compartment including a second plurality of holes, the interior compartment disposed coaxially within the exterior compartment. A rate of hydraulic oil communication between the exterior compartment and the interior compartment may depend on a number of the first plurality of holes and the second plurality of holes placed in alignment with one another. This number of first plurality of holes and second plurality of holes that are placed in alignment with one another may be changed by rotating the exterior compartment relative to the interior compartment by the set gear.

According to some implementations, the vertical wind turbine may further include a self-adjusting mechanism mounted on the chassis. The self-adjusting mechanism may be configured to actuate the control valve based on a rotational speed of the vertically oriented rotor shaft.

According to one implementation, the self-adjusting mechanism may include a pendulum mechanism including a mass attached to a distal end of a pendulum rod, a spool-type piston disposed within a second cylinder, the second cylinder including a first port, a second port, and a third port, the first port in fluid communication with a hydraulic oil reservoir. The spool-type piston can be coupled with the pendulum rod. In an aspect, the self-adjusting mechanism can include a second hydraulic jack in fluid communication with the second port and the third port of the second cylinder, a second port in fluid communication with a cap side of the second hydraulic jack, and a third port in fluid communication with a rod end of the second hydraulic jack. In an implementation, the second hydraulic jack can include a second piston coupled with the set screw via a second rack. In an aspect, a back and forth movement of the pendulum rod responsive to the mass moving back and forth relative to the second cylinder under the centrifugal force exerted on the mass due to the rotational movement of the vertically oriented rotor shaft can urge a back and forth movement in the spool-type piston. This in turn can distribute hydraulic oil received from the first port into the second port and the third port, based on an extent to which the spool-type piston moves back and forth in the second cylinder. In response to hydraulic oil being discharged from the second port into the cap end of the second hydraulic jack, the second piston may move forth and rotate the set screw in a first direction, and responsive to hydraulic oil being discharged from the third port into the rod end of the second hydraulic jack, the second piston may move back and rotate the set screw in a second direction.

According to some implementations, the pendulum rod, the mass, and the coupling of the spool-type piston to the pendulum rod can be configured such that when a rotational speed of the rotor axis exceeds a reference, a centrifugal force on the mass urges the pendulum rod to a position that urges the spool-type piston toward the cylinder distal end. In an aspect, the spool-type piston, the first port, the second port, and the third port can be configured such that when the spool-type piston is toward the cylinder distal end, hydraulic oil is pumped through the third port into the rod end of the second hydraulic jack, sufficient to move the second piston forth and rotate the set screw in the first direction.

In one or more implementations, the pendulum rod, the mass, and the coupling of the spool-type piston to the pendulum rod can be configured such that when a rotational speed of the rotor axis reduces to less than the reference, the centrifugal force on the mass reduces, and the pendulum rod moves to a position that urges the spool-type piston toward the cylinder proximal end. In an aspect, the spool-type piston, the first port, the second port, and the third port can be configured such that when the spool-type piston is toward the cylinder proximal end, hydraulic oil is pumped through the second port into the cap side of the second hydraulic jack, sufficient to move the second piston back and rotate the set screw in the second direction.

According to some implementations, each of the plurality of upper blade panels may pivot about the pivotal axis defined by the upper panel first edge to a closed position responsive to wind flowing toward the upper panel second edge.

According to some implementations, each of the plurality of lower blade panels pivots about the pivotal axis defined by the lower panel first edge to a closed position responsive to wind flowing toward the lower panel second edge.

According to one or more implementations, a wind turbine can include a rotor shaft, having an axis, and a radially extended arm, movably supported by the rotor shaft, having an end proximal to the rotor shaft and having a distal end, the movable support being configured such that the distal end is movable about the axis. In an implementation, the wind turbine can include a chassis attached to the distal end of the radially extended arm, and the chassis can have an upper portion and a lower portion, and can include an upper blade panel, having an upper panel first edge and an opposing upper panel second edge, the upper blade panel pivotally mounted on the upper portion of the chassis from the upper panel first edge, and can be rotatable between a closed position and an open position around a pivotal axis defined by the upper panel first edge. In aspect, the wind turbine can include an upper guide link pivotally coupled to the upper panel second edge, a lower blade panel, having a lower panel first edge and an opposing lower panel second edge, and the lower blade panel can be pivotally mounted on the lower portion of the chassis from the lower panel first edge and can be rotatable between a closed position and an open position around a pivotal axis defined by the lower panel first edge. The wind turbine can also include, according to one or more implementations, an upper shaft coupled to the upper guide link in a configuration wherein a movement of upper guide link couples with a rotation of the upper shaft, and can include a lower shaft coupled to the lower guide link, in a configuration such that a movement of the lower guide link urges a rotation of the lower shaft. In an aspect, the wind turbine can include a coupling between the upper shaft and the lower shaft, and the coupling can be configured to mutually couple rotation of the upper shaft and lower shaft.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Figure 1:
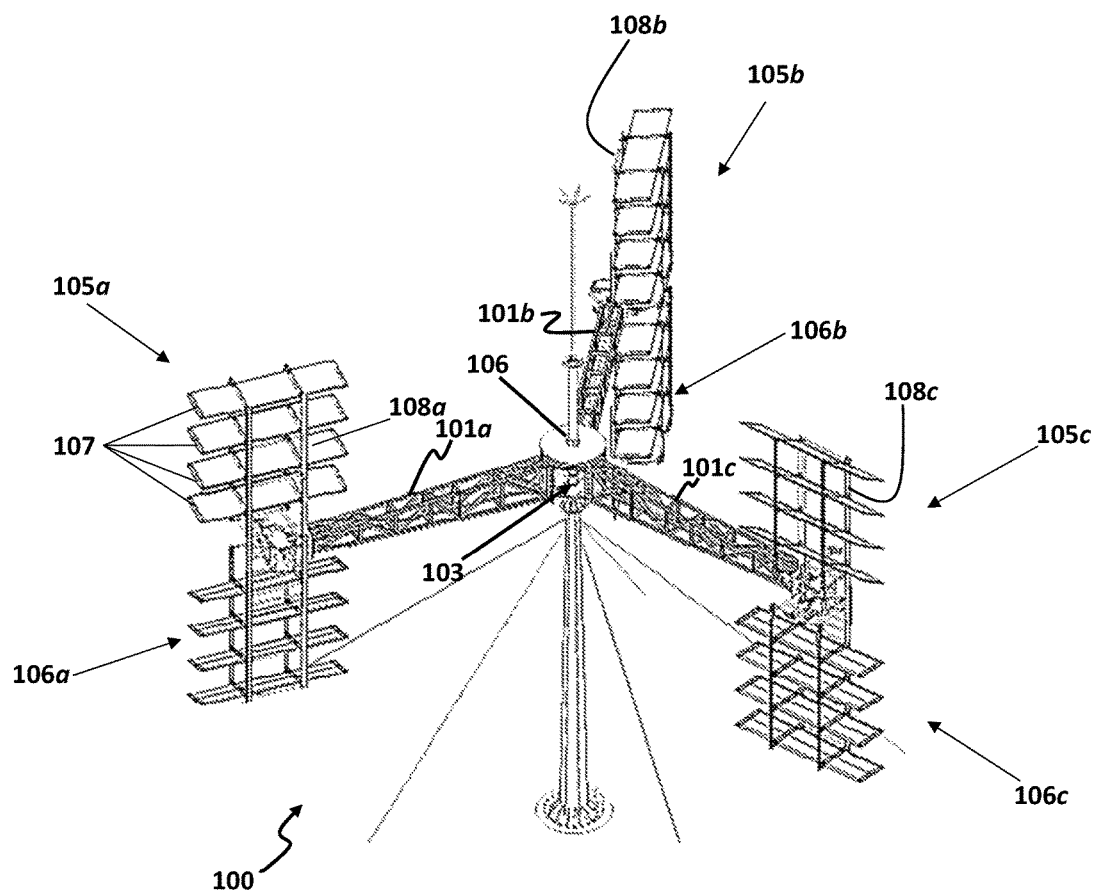
FIG. 1 illustrates a perspective view of an implementation of a vertical axis turbine.

Referring to FIG. 1, an implementation of a vertical axis turbine 100 may include a rotor that has a vertically-oriented shaft 103 and a plurality of radially extended arms 101a, 101b, and 101c attached to the vertically-oriented shaft 103. In some implementations, the radially extended arms 101a, 101b, and 101c may be mounted or otherwise be rotatably mounted on the vertically-oriented shaft 103. In an example, the radially extended arms 101a, 101b, and 101c may be mounted by a ball-bearing on the vertically-oriented shaft 103.

Referring to FIG. 1, in some implementations, the vertical axis turbine 100 may further include an upper blade set and a lower blade set mounted on a distal portion of each of the plurality of radially extended arms 101a, 101b, and 101c. For example, in the implementation shown in FIG. 1, upper blade set 105a and lower blade set 106a are mounted on radially extended arm 101a; upper blade set 105b and lower blade set 106b are mounted on radially extended arm 101b; and upper blade set 105c and lower blade set 106c are mounted on radially extended arm 101c. According to some implementations, each blade set, either upper or lower, may include a plurality of blade panels. For example, in the implementation shown in FIG. 1, upper blade set 105a includes a plurality of blade panels 107. In an implementation, all blade sets 105a-c and 106a-c may have similar configurations.

With reference to FIG. 1, in some implementations, radially extended arms 101a, 101b, and 101c may further include chassis 108a, 108b, and 108c attached to their distal ends, respectively. The upper and lower blade sets of each radially-extended arm may be mounted on its respective chassis, for example, in the implementation shown in FIG. 1, the upper blade set 105a and lower blade set 106a are mounted on chassis 108a; upper blade set 105b and lower blade set 106b are mounted on chassis 108b; and upper blade set 105c and lower blade set 106c are mounted on chassis 108c. In an implementation, each chassis such as the chassis 108a may be mounted or otherwise be attached to the distal end of a corresponding radially extended arm such as the radially extended arm 101a via a number of screws and/or any other similar connecting mechanisms, such that any movement of each chassis relative to the corresponding radially extended arm of that chassis is minimized or prevented. In some implementations, radially extended arms 101a, 101b, and 101c and chassis 108a, 108b, and 108c may be manufactured seamlessly, as a unique or unitary/integral part or structure.

Figure 2A:
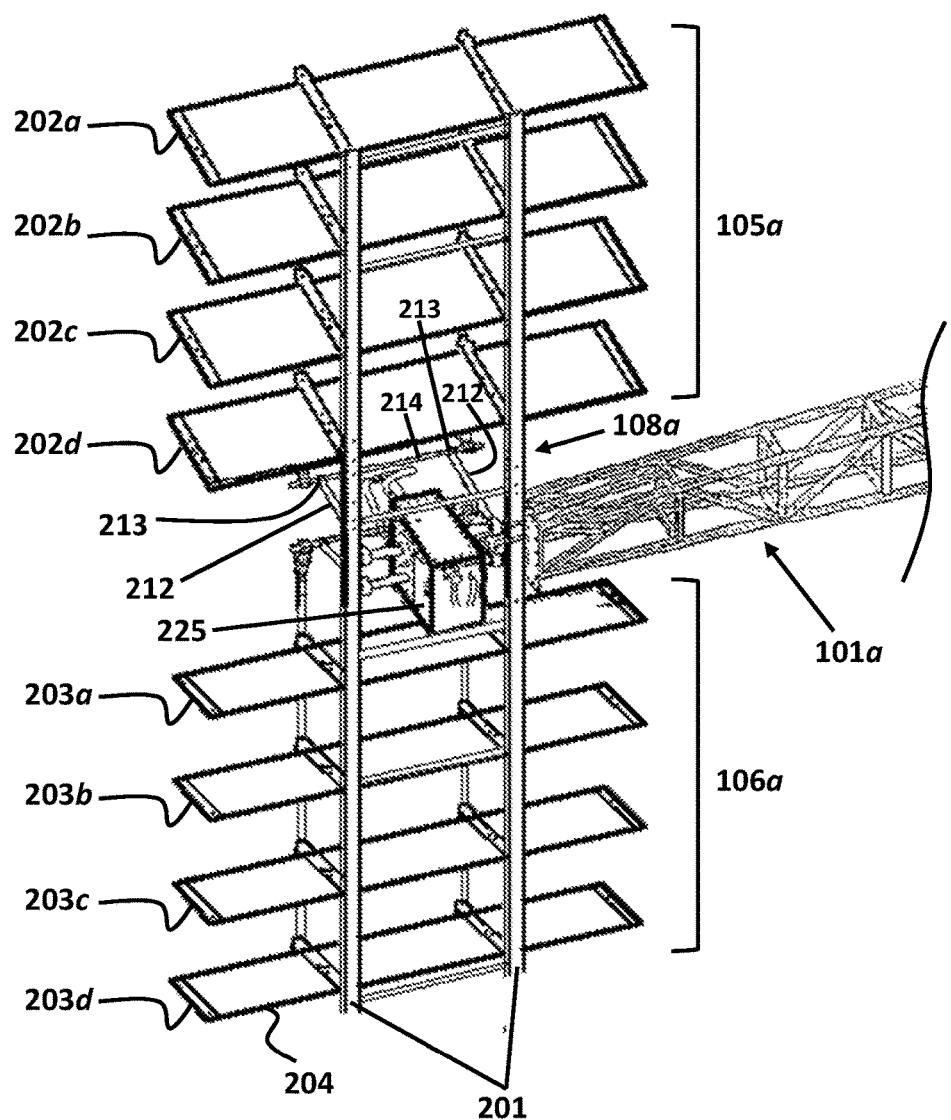
FIG. 2A illustrates an implementation of upper blade set and lower blade set mounted on a chassis of a radially extended arm, according to one or more implementations of the present disclosure.

FIG. 2A illustrates an implementation of upper blade set 105a and lower blade set 106a mounted on chassis 108a of the radially extended arm 101a. It should be appreciated that all radially extended arms 101a-c, their respective chassis 108a-c, and blade sets 105a-c, 106a-c may be similar. Referring to FIG. 2A, chassis 108a may include two parallel vertical rods 201 interconnected by a number of horizontal supports (not explicitly labeled) and chassis 108a may be attached to a distal end of the radially extended arm 101a via, for example, a number of screws and/or any other similar connecting mechanisms. The upper blade set 105a may include upper blade panels 202a-d and the lower blade set 106a may include lower blade panels 203a-d. According to an implementation, each blade panel may be pivotally mounted from a first edge thereof on two parallel rods 109 of chassis 108a by two hinges. For example, upper blade panel 203d may be pivotally mounted from upper panel first edge 204 on two parallel rods 201 of chassis 108a by two hinges (obscured from view in FIG. 2A).

Figure 2B:
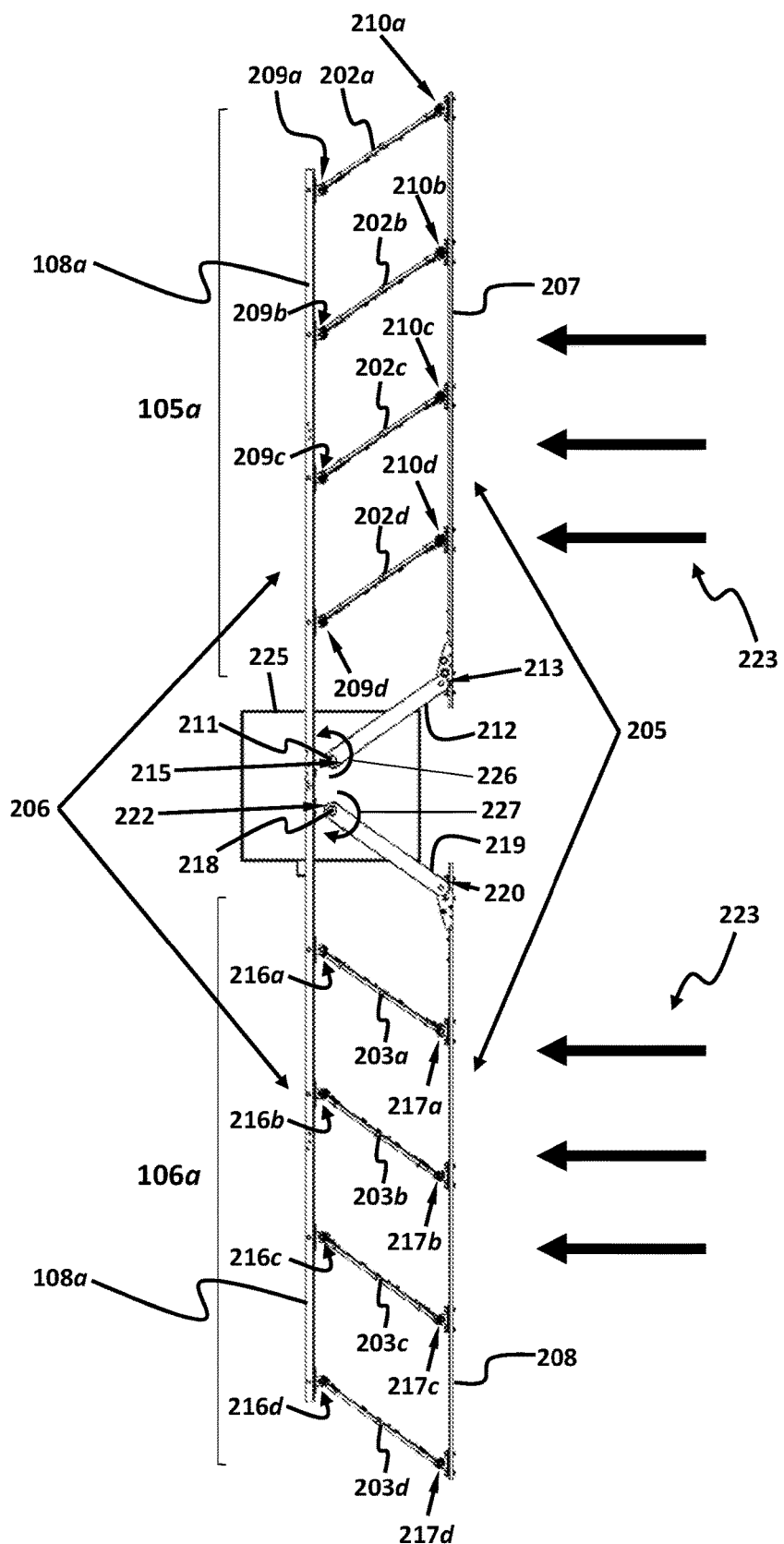
FIG. 2B illustrates a side view of an implementation of an upper blade set and a lower blade set mounted on a chassis.

FIG. 2B illustrates a side view of an implementation of upper blade set 105a and lower blade set 106a mounted on chassis 108a. The upper blade set 105a and lower blade set 106a may have a front side 205 and a back side 206. Each of the upper blade panels in the upper blade set 105a may be pivotally mounted from an upper panel first edge to the chassis 108a and from an opposing upper panel second edge to two parallel upper guide links 207. While, each of the lower blade panels in the lower blade set 106b may be pivotally mounted from a lower panel first edge onto the chassis 108a and from an opposing lower panel second edge to two parallel lower guide links 208. For example, in the implementation shown in FIG. 2B, upper blade panels 202a-d may be pivotally mounted from their upper panel first edges 209a-d onto chassis 108a and from their upper panel second edges 210a-d onto parallel upper guide links 207. According to one implementation, each of the upper panel first edges 209a-d may be mounted onto the chassis 108a by two hinges, two pin connections or any other similar mechanisms. This pivotal connection between the upper panel first edges 209a-d of the upper blade panels 202a-d and the chassis 108a allows for the upper blade panels 202a-d to rotate about axes parallel to their respective upper panel first edges 209a-d between an open position and a closed position. In the open position, each upper blade panel defines an angle of about 90° with the chassis 108a and in the closed position, each upper blade panel defines an angle of about 0° with the chassis 108a. According to another implementation, each of the upper panel second edges 210a-d may be mounted onto the parallel upper guide links 207 by two hinges, two pin connections or any other similar mechanisms. This pivotal connection between the upper panel second edges 210a-d of the upper blade panels 202a-d and the parallel upper guide links 207 allows for synching the pivotal movement of the upper blade panels 202a-d and transferring the pivotal movement of the upper blade panels 202a-d to an upper shaft 211 via two upper links 212 (one of the upper links 212 obscured from view in FIG. 2B but visible in FIG. 2A). Referring to FIGS. 2A and 2B, the upper links 212 may be pivotally connected from distal ends 213 to an upper connecting rod 214 that connects lower ends of the parallel upper guide links 207. The upper links 212 may further be pivotally connected to the upper shaft 211 from proximal ends 215. The pivotal rotation of the upper blade panels 202a-d leads to a translational movement of the parallel upper guide links 207 which may be transferred via the upper link 212 to the pivotal rotation of the upper shaft 211 about a pivot point defined by proximal ends 215.

In another example, in the implementation shown in FIG. 2B, lower blade panels 203a-d may be pivotally mounted from their lower panel first edges 216a-d onto chassis 108a and from their lower panel second edges 217a-d onto parallel lower guide links 208. According to one implementation, each of the lower panel first edges 216a-d may be mounted onto the chassis 108a by two hinges, two pin connections or any other similar mechanisms. This pivotal connection between the first edges 216a-d of the lower blade panels 203a-d and the chassis 108a allows for the lower blade panels 203a-d to rotate about axes parallel to their respective lower panel first edges 216a-d between an open position and a closed position. In the open position, each lower blade panel defines an angle of about 90° with the chassis 108a and in the closed position, each lower blade panel defines an angle of about 0° with the chassis 108a. According to another implementation, each of the second edges 217a-d may be mounted onto the parallel lower guide links 208 by two hinges, two pin connections or any other similar mechanisms. This pivotal connection between the lower panel second edges 217a-d of the lower blade panels 203a-d and the parallel lower guide links 208 allows for synching the pivotal movement of the lower blade panels 203a-d and transferring the pivotal movement of the lower blade panels 203a-d to a lower shaft 218 via two lower links 219 (one of the lower links 219 obscured from view in FIG. 2B). The lower links 219 may be pivotally connected from distal ends 220 to a lower connecting rod 221 that connects upper ends of the parallel lower guide links 208. The lower links 219 may further be pivotally connected to the lower shaft 218 from proximal ends 222. The pivotal rotation of the lower blade panels 203a-d leads to a translational movement of the parallel lower guide links 208 which may be transferred via the lower link 219 to the pivotal rotation of the lower shaft 218 about a pivot point defined by proximal ends 222.

Referring to FIGS. 2A and 2B, a control box 225 may further be mounted on a distal end of the radially extended arm 101a. The upper shaft 211 and the lower shaft 218 may be disposed within the control box 225.

Figure 4A:
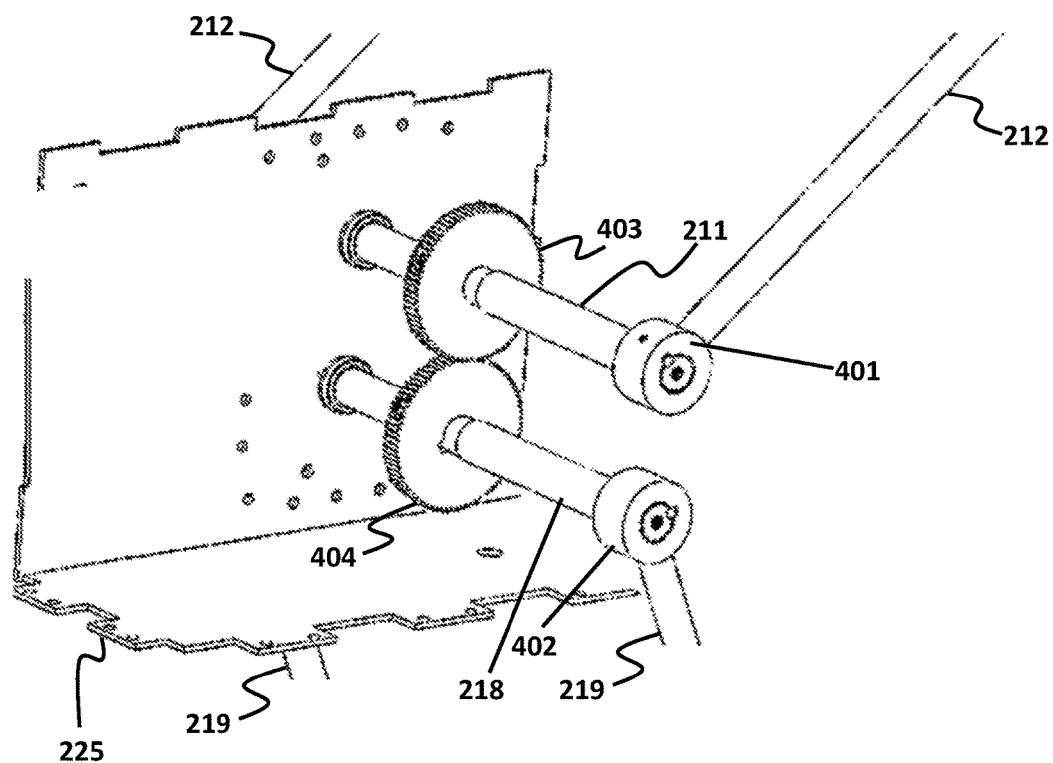
FIG. 4A illustrates a sectional view of an implementation of a control box.

FIG. 4A illustrates a sectional view of an implementation of the control box 225. As shown in FIG. 4A, in one implementation, upper links 212 may be coupled with the upper shaft 211 via, for example, pin connections at either ends of the upper shaft 211 (only one pin connection 401 is visible in FIG. 4A). Lower links 219 may be coupled with the lower shaft 218 via, for example, pin connections at either ends of the lower shaft 218 (only one pin connection 402 is visible in FIG. 4A). In one implementation, an upper gear 403 may be mounted on the upper shaft 211, where the upper gear 403 may be rotatable with the upper shaft 211. A lower gear 404 may further be mounted on the lower shaft 218, where the lower gear 404 may be rotatable with the upper shaft 218. According to some implementations, the upper gear 403 and the lower gear 404 may mesh with one another such that the upper shaft 211 and the lower shaft 218 may be coupled, meaning the rotational movement of the upper shaft 211 may be transferred to the lower shaft 218 and vice versa.

Figure 2C:
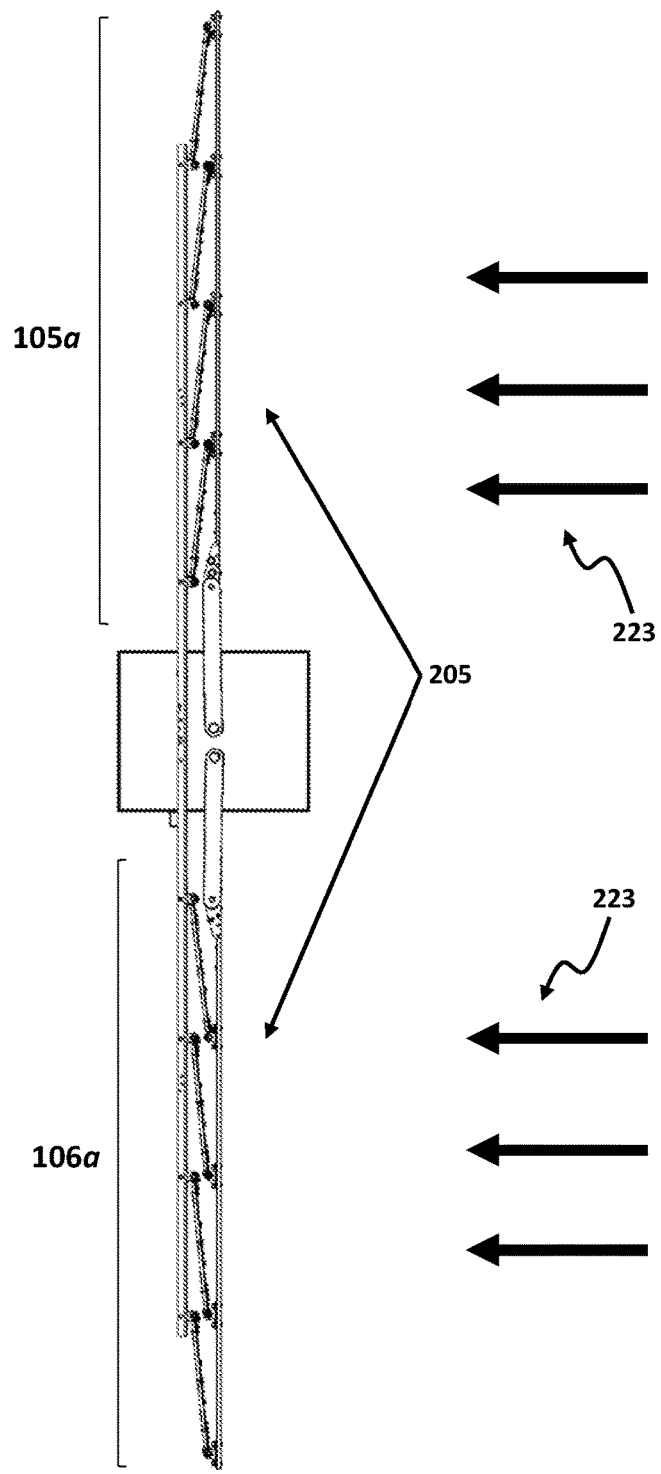
FIG. 2C illustrates a side view of an implementation of an upper blade set and a lower blade set mounted on a chassis.

Referring to FIG. 2B, when the wind flows toward the front side 205 of the upper blade set 105a and the lower blade set 106a as shown by arrows 223, the wind generates a force on the blade panels 202a-d, 203a-d that causes each blade panel to rotate from its open position to its closed position as shown in FIG. 2C. In this case, the wind is blocked by blade panels 202a-d, 203a-d of the upper blade set 105a and the lower blade set 106a thereby generating a force on the upper blade set 105a and the lower blade set 106a. As the upper blade panels 202a-d rotate to their closed position, the parallel upper guide links 207 move upwardly. This causes the upper links 212 to pivot upwardly in the direction shown by arrow 226. The upward rotation of the upper links 212 urges a rotational movement of the upper shaft 211 about its longitudinal axis in the direction shown by arrow 226. As the lower blade panels 203a-d rotate to their closed position, the parallel lower guide links 208 move downward. This causes the lower links 219 to pivot downwardly in the direction shown by arrow 227. The downward rotation of the lower links 219 urges a rotational movement of the lower shaft 218 about its longitudinal axis in the direction shown by arrow 227. With further reference to FIG. 4A, coupling the upper shaft 211 and the lower shaft 218 via the upper gear 403 and the lower gear 404 causes the force of the wind pushing the upper blade panels 202a-d upwardly toward their closed position and the force of the wind pushing the lower blade panels 203a-d downwardly toward their closed position to be partially neutralized by one another. Benefits from this implementation may include, but are not limited to, minimizing of noise and unwanted vibration of the vertical axis turbine 100 during the rotation. It should be understood that, in this implementation, the noise and unwanted vibration of the vertical wind turbine 100 are minimized because the vertical reaction of the wind force on upper blade panels 202a-d and the vertical reaction of the wind force on the lower blade panels 203a-d may be neutralized by each other.

Figure 2D:
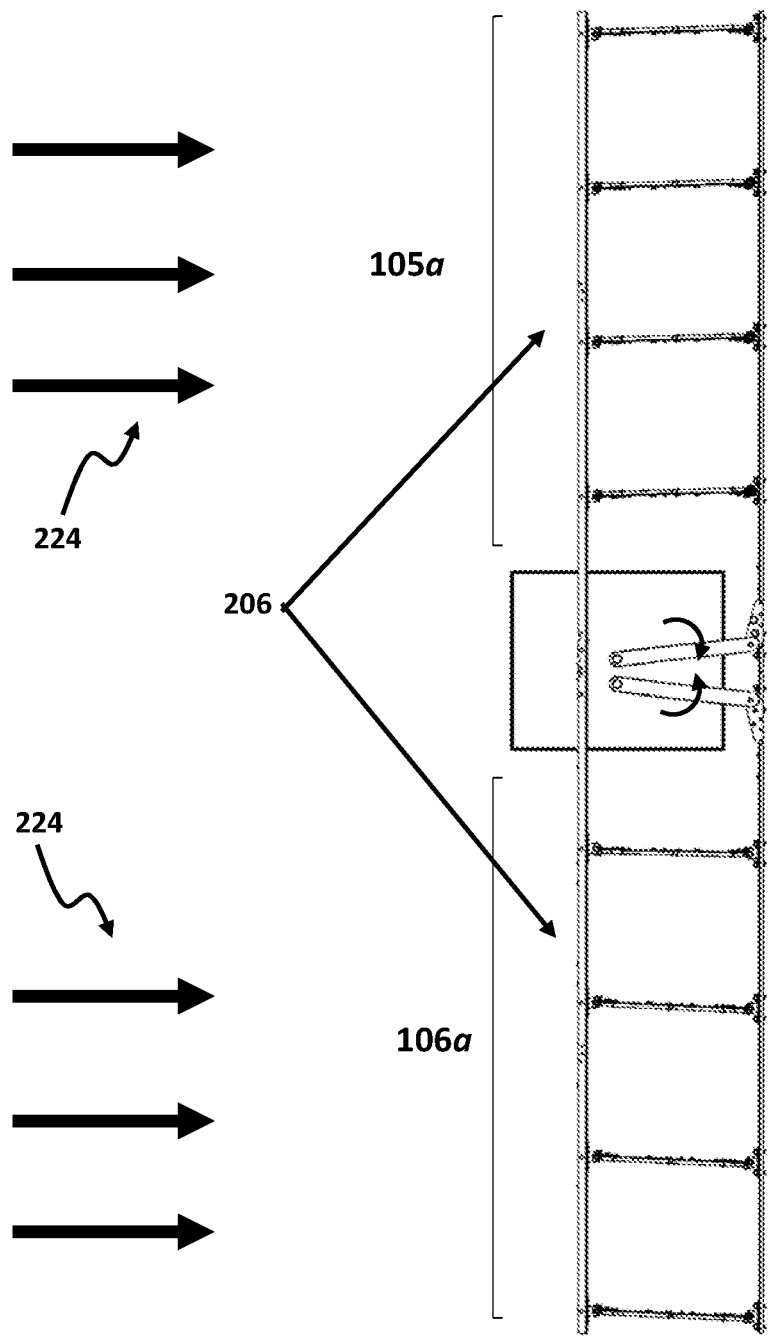
FIG. 2D illustrates a side view of an implementation of an upper blade set and a lower blade set mounted on a chassis.

Referring to FIG. 2D, when the wind flows toward the back side 206 of the upper blade set 105a and the lower blade set 106a, as shown by arrows 224, the wind generates a force on the blade panels 202a-d, 203a-d that causes each blade panel to rotate from its closed position to its open position. Consequently, the wind flows through the upper blade set 105a and the lower blade set 106a and little or no force is generated on the upper blade set 105a and the lower blade set 106a.

Referring to FIGS. 1 through 2D, it will be understood that the illustrated quantity of upper blade panels in the upper blade sets 105a, 202a-d, namely, four, and corresponding quantity of lower blade panels 106a, 203a-d is only for purposes of example, and is not intended as any limitation on practices according to this disclosure. For example, an implementation can include three, or two upper and lower blade panels. In addition, an implementation can include just one upper blade panel and one lower blade panel. One example configuration for such an implementation can be as depicted in FIGS. 2A-2D, but removing three of the illustrated four upper blade panels 202a-d and three of the illustrated four lower blade panels 203a-d. In addition, the example quantity of two parallel upper guide links 207, and two parallel lower guide links 208 is not intended as any limitation on practices according to this disclosure. For example, an implementation may utilize one upper guide link that, for example, can be centered with the upper blade panels. Similarly, an implementation may utilize one lower guide link that, for example, can be centered with the lower blade panels.

Figure 3:
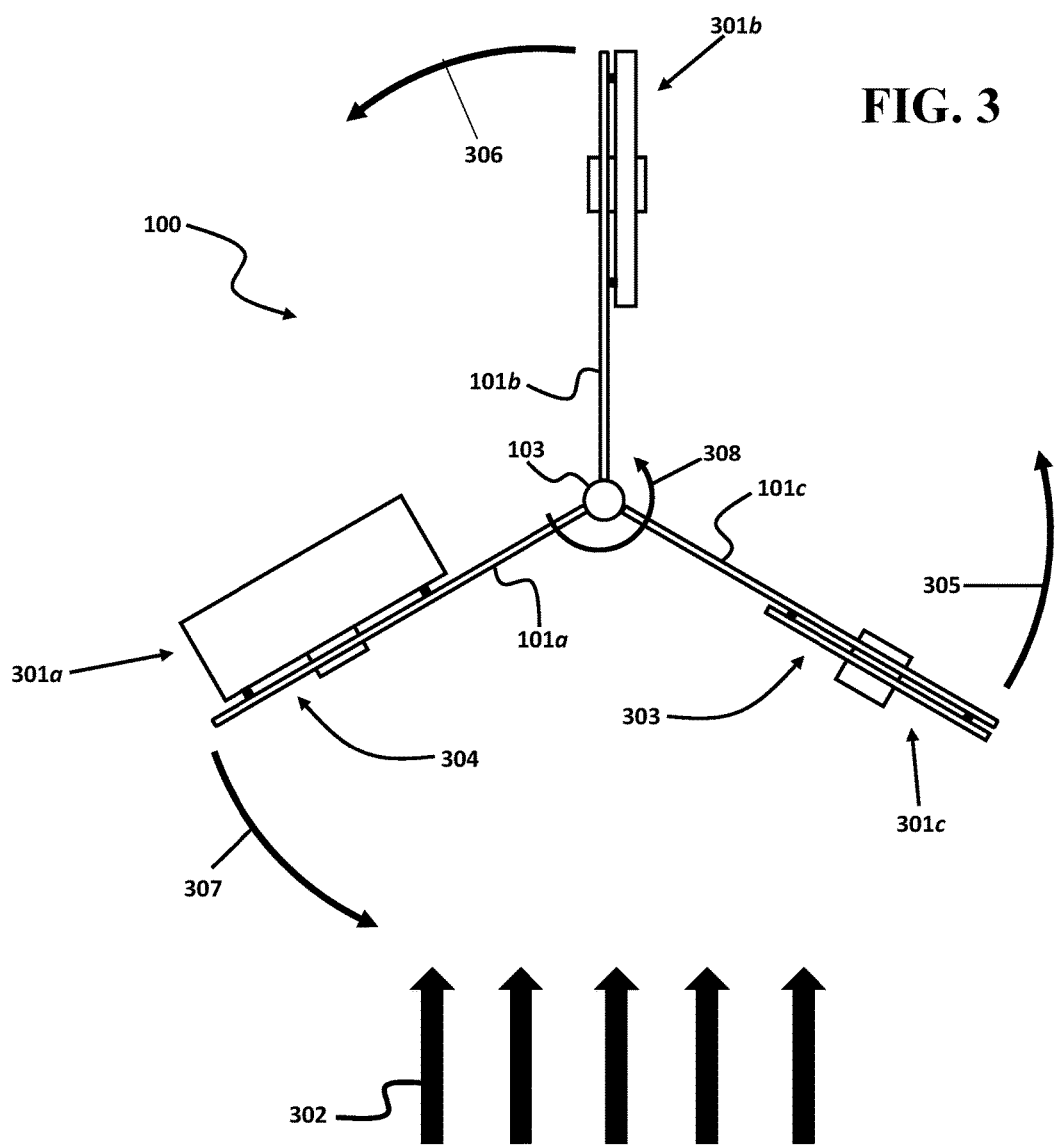
FIG. 3 illustrates a top-view schematic representation of an implementation of the vertical axis turbine.

FIG. 3 illustrates a top-view schematic representation of an implementation of the vertical axis turbine 100. In the implementation shown in FIG. 3, the vertical axis turbine 100 includes the vertically-oriented rotor shaft 103 and three radially extended arms 101a-c that are connected to the vertically-oriented rotor shaft 103. Each radially extended arm includes two blade sets attached to the distal portion of that radially extended arm. For ease of reference, the upper and lower blade sets of the radially extended arms 101a, 101b, and 101c are referred to by reference numerals 301a, 301b, and 301c, respectively. With reference to FIGS. 1 and 3, it should be appreciated that reference numeral 301a refers to upper blade sets 105a and lower blade set 106a; reference numeral 301b refers to upper blade sets 105b and lower blade set 106b; and reference numeral 301c refers to upper blade sets 105c and lower blade set 106c. When wind flows in the environment of the vertical axis turbine 100 in the direction shown by arrows 302, the wind flows toward the front side 303 of the blade sets 301c and forces the blade panels of the blade sets 301c to rotate to their closed position and as was described in connection with FIG. 2C, once the blade panels of the blade sets 301c are in their closed position, the blade sets 301c block the wind thereby generating a force on the blade sets 301c which propels the radially extended arm 101c to rotate around the vertically-oriented shaft 103 in the direction shown in by arrow 305.

Referring to FIG. 3, when wind flows in the environment of the vertical axis turbine 100 in the direction shown by arrows 302, the wind flows toward the back side 304 of the blade sets 301a and forces the blade panels of the blade sets 301a to rotate to their open position and as was described in connection with FIG. 2D, once the blade panels of the blade sets 301a are in their open position, the wind flows through the blade sets 301a and little or no force is generated on the blade sets 301a. When the wind flows continuously in the environment of the vertical axis turbine 100, the propelling force is generated on the blade sets 301a , 301b, and 301c alternatively and pushes the corresponding radially extended arms to rotate continuously in the direction shown by arrows 305, 306, and 307. This, in turn, causes the vertically oriented shaft 103 to rotate in the direction shown by arrow 308. With further reference to FIG. 1, in some implementations, the vertical axis turbine 100 may further include an electric generator 106 that may be coupled with the vertically oriented shaft 103 to convert the mechanical energy of the vertically oriented shaft 103 to electricity.

Figure 4B:
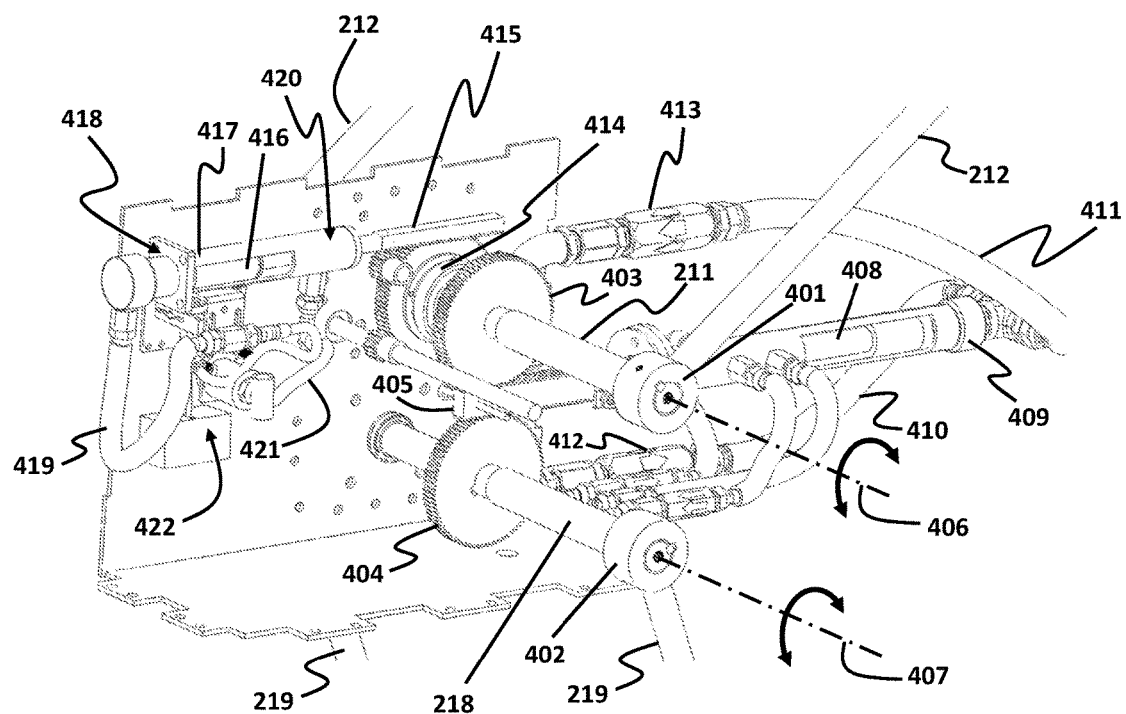
FIG. 4B illustrates a sectional view of another implementation of a control box.

FIG. 4B illustrates a sectional view of another implementation of the control box 225. As shown in FIG. 4B, in one implementation, a first rack 405 may be interposed meshably between the upper gear 403 and the lower gear 404. In one implementation, the lower gear 404 may mesh with a lower side of the first rack 405, and the upper gear 403 may mesh with an upper side of the first rack 405. Meshed engagement of the first rack 405 with the lower gear 404 and the upper gear 403 limits the rotational movement of the lower shaft 218 and the rotational movement of the upper shaft 211 to rotational movements in opposite directions, with similar rotational speeds about an upper axis 406 and a lower axis 407, respectively.

Referring to FIG. 4B, in some implementations, a first piston 408 of a first hydraulic jack 409 may be mounted or otherwise be attached to a distal end of the first rack 405 in a configuration such that the translational movements of the first rack 405 urges the first piston 408 of the first hydraulic jack 308 to move back and forth and thereby pump in or pump out the hydraulic oil from the first hydraulic jack 409. According to the FIG. 4B, it will be understood that, responsive to extension of the first piston 408, a hydraulic oil may be pumped into the first hydraulic jack 409 cylinder from a first hydraulic hose 410. In some implementations, the first hydraulic hose 410 may be in fluid communication with a hydraulic oil reservoir. Likewise, responsive to retraction of the first piston 408, hydraulic oil is pumped out of the first hydraulic jack 409 cylinder into a second hydraulic hose 411. In an implementation, a first check valve 412 may be secured at a distal end of the first hydraulic hose 410 and a second check valve 413 may be secured at a distal end of the second hydraulic hose 411. The check valves can limit the first hydraulic jack 409 to draw the hydraulic oil into its cylinder from the first hydraulic hose 410 responsive to the first piston 408 extension, and to discharge the hydraulic oil out of its cylinder via the second hydraulic hose 411 responsive to the first piston 408 retraction.

For purposes of clarity, referring to FIGS. 2B and 4B, when the wind flows toward the front side 205 of the blade sets 105a and 106a, the upper blade panels 202a-d are pushed upward to their closed position and the lower blade panels 203a-d are pushed downward to their closed position. Such movement of the upper blade panels 202a-d causes the upper shaft 211 to have a counterclockwise rotational movement about the upper axis 406, and the movement of lower blade panels 203a-d causes the lower shaft 218 to have a clockwise rotational movement about the lower axis 407. The counterclockwise rotation of the upper shaft 211 and the clockwise rotation of the lower shaft 218 are transferred by the upper gear 403 and the lower gear 404, respectively, to linear movement of the first rack 405 in a direction that pushes the first piston 408 into the first hydraulic jack 409 and thereby discharging the hydraulic oil out of the first hydraulic jack 409. Therefore, controlling the amount of the hydraulic oil discharged from the first hydraulic jack 409 can control the amount of the rotational movement of the upper shaft 211 and the lower shaft 218. In other words, controlling the amount of the hydraulic oil discharged from the first hydraulic jack 409 can control the extent to which the upper blade panels 202a-d and the lower blade panels 203a-d are closed in the face of the blowing.

To control the amount of hydraulic oil discharge from the first hydraulic jack 409, in some implementations, the second hydraulic hose 411 (which is the discharged path of the first hydraulic jack 409) may be intercepted by a control valve 414. In order to provide greater clarity to the reader regarding the implementations disclosed herein, additional details of the control valve 414 are provided with respect to FIG. 5A and FIG. 5B.

Figure 5A:
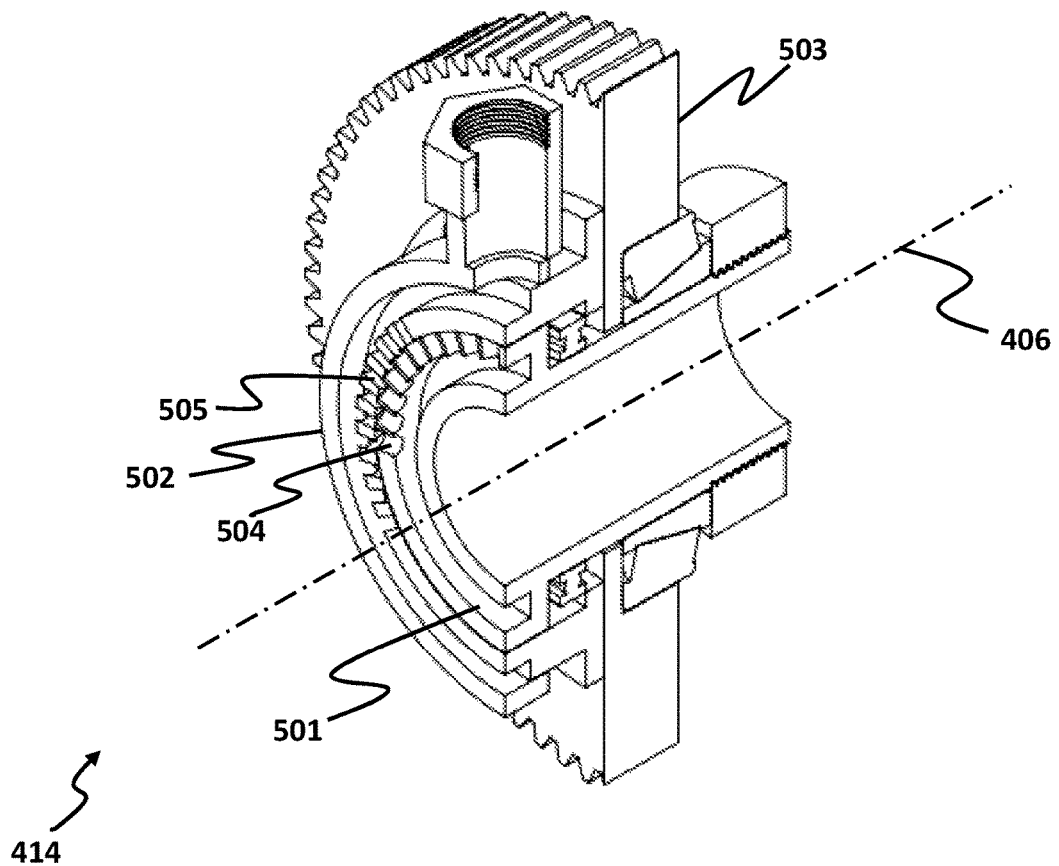
FIG. 5A illustrates a sectional view of an implementation of a control valve.
Figure 5B:
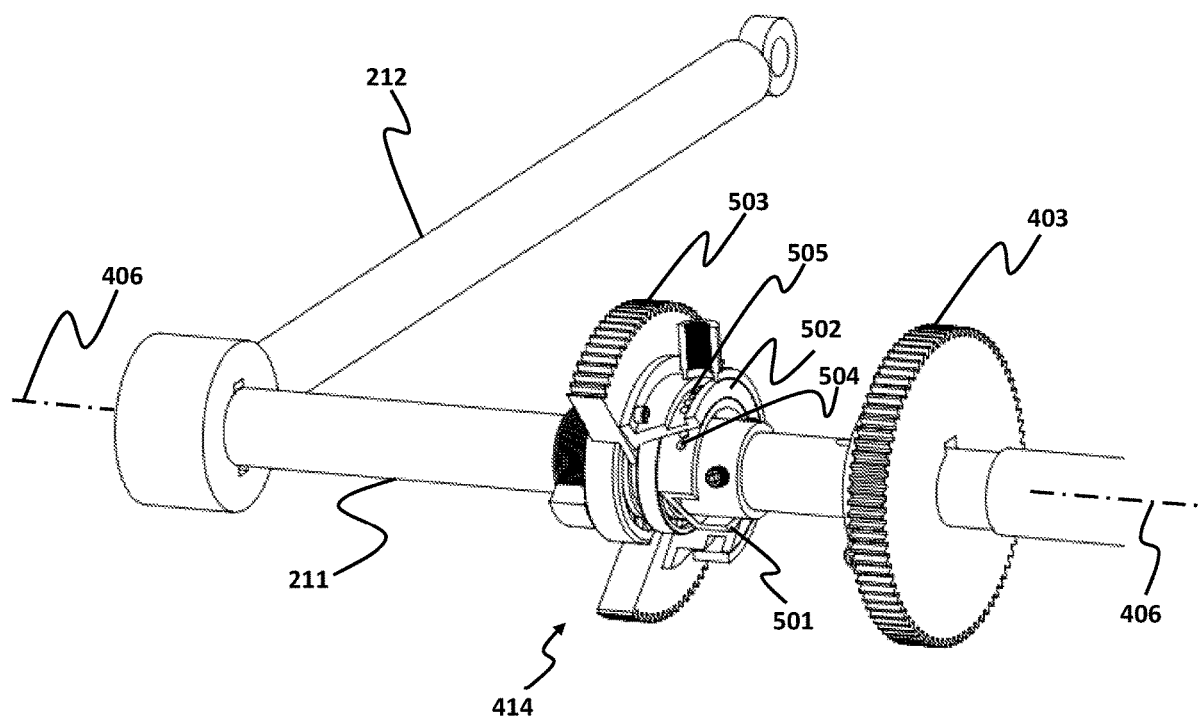
FIG. 5B illustrates a sectional view of an implementation of a control valve mounted on an upper shaft.

Referring now to FIG. 5A and FIG. 5B, these show two sectional views of one implementation of control valve 414 that may be utilized to control the amount of hydraulic oil discharge from the first hydraulic jack 409, thereby limiting the maximum retraction amount of the first piston 408. In some implementations, the control valve 414 may include an interior compartment 501, an exterior compartment 502, and a set gear 503. In some implementations, the interior compartment 501 may be configured to rotate synchronously with the upper shaft 211. The interior compartment 501 may be disposed rotatably within the exterior compartment 502, in a configuration such that responsive to the rotational movement of the upper shaft 211, the interior compartment 501 rotates synchronously with the upper shaft 211 without any surplus rotation of the exterior compartment 502. For example, in some implementations, the interior compartment 502 may be disposed rotatably in the exterior compartment 502 via a ball bearing mechanism or other similar mechanisms. Furthermore, in some implementations, the set gear 503 may be mounted or otherwise attached to the exterior compartment 502 such that any movement of the set gear 503 relative to the exterior compartment 502 is minimized or prevented. For example, the set gear 503 may be mounted or otherwise be attached to the exterior compartment 502 via a plurality of screws (obscured from the view in FIGS. 5A and 5B) and/or any other similar connecting mechanisms. However, in some implementations, the set gear 503 and the exterior compartment 502 may be manufactured seamlessly to constitute a unique or unitary/integral part.

As shown in FIG. 5A and FIG. 5B, in some implementations, a first plurality of holes 504 may be provided on the outer layer of the interior compartment 501. Similarly, in some implementations, a second plurality of holes 505 may be provided at the inner layer of the exterior compartment 502. The first plurality of holes 504 and the second plurality of holes 505 can provide benefits including, but not limited to, establishing a fluid communication path between the interior compartment 501 and the exterior compartment 502. It should be understood that the fluid communication between the interior compartment 501 and the exterior compartment 502 may be effectuated when the interior compartment 501 and the exterior compartment 502 are secured in a manner such that a part of the interior holed section (a section of the interior compartment 501 on which the first plurality of holes 504 are provided) is in front of the exterior holed section (a section of the exterior compartment 502 on which the second plurality of holes 505 are provided).

Referring to FIGS. 5A and 5B, it should be understood that discharge rate of the fluid that communicates between the interior compartment 501 and the exterior compartment 502 can be substantially dependent on the number of the first plurality of holes 504 and the second plurality of holes 505 that are placed in front of, i.e., in alignment with each other. Consequently, by rotating the exterior compartment 502 about the upper axis 406, due to the limited rotation range of the interior compartment 501 about the upper axis 406, the discharge rate of the fluid communicating between the interior compartment 501 and the exterior compartment 502 can be controlled. In some implementations, discharge rate of the fluid communicating between the interior compartment 501 and the exterior compartment 502 at the uppermost rotational range of the interior compartment 501 can be set by disposing the exterior compartment 502 in a determined rotational position about the upper axis 406. Referring back to FIG. 4B, the maximum retraction amount of the first piston 408 may be limited by adjusting the discharge rate of the fluid communicating between the interior compartment 501 and the exterior compartment 502 at the uppermost rotational range of the interior compartment 501. According to above explanations and mentioned mechanisms, it should be understood that dependency of the maximum retraction amount of the first piston 408 to the rotational position of the exterior compartment 502 about the upper axis 406 can offer a controllability, for example for an operator, on the range within which the upper blade panels 105a-d and the lower blade panels 106a-d can rotate. Benefits from controllability on the range within which the upper blade panels 105a-d and the lower blade panels 106a-d can rotate may include, but are not limited to, providing the operator with a means of controlling and/or adjusting the efficiency of the disclosed vertical axis turbine 100. For example, in some implementations, the set gear 503 may be coupled to a device in a configuration such that the operator is able to define the rotational position of the exterior compartment 502 with a handle. The efficiency of the vertical axis turbine 100 can be controlled and/or adjusted by determining the upper most range at which the upper blade panels 105a-d and the lower blade panels 106a-d can rotate.

Referring to FIGS. 4B, 5A, and 5B, in some implementations, a second rack 415 can be connected to a distal end of a second piston 416 of a second hydraulic jack 417, and may be utilized to adjust and/or alter rotational position of the exterior compartment 502 about the upper axis 406. In one implementation, the second rack 415 may mesh with the set gear 503. It can be understood that, due to the meshed engagement of the second rack 415 with the set gear 503 and the connection of the second rack 415 to the distal end of the second piston 416, adjustment and/or alteration of the exterior compartment 502 rotational position about the upper axis 406 may be implemented by extension and/or retraction of the second piston 416. It will be understood that the above-explained structures and operations therefore can provide a control or adjustment of the efficiency of the disclosed vertical axis turbine 100, by controlling and/or adjusting the extension and/or retraction of the second piston 416.

Referring to FIG. 4B, in some implementations, a cap end 418 of the second hydraulic jack 417 may be in fluid communication with a third hydraulic hose 419. Similarly, a rod end 420 of the second hydraulic jack 417 may be in fluid communication with a fourth hydraulic hose 421. With further reference to FIGS. 5A and FIG. 5B, it can be understood that responsive to pumping a hydraulic oil into the cap end 418 of the second hydraulic jack 417 through the third hydraulic hose 419, the exterior compartment 502 may rotate clockwise about the upper axis 406 and thereby alter the vertical axis turbine 100 efficiency. It can also be understood that responsive to pumping a hydraulic oil into the rod end 420 of the second hydraulic jack 417 through the fourth hydraulic hose 421, the exterior compartment 502 may rotate counterclockwise about the upper axis 406 and thereby alter the vertical axis turbine 100 efficiency. In some implementations, the third hydraulic hose 419 and the fourth hydraulic hose 421 may be in fluid communication with a hydraulic oil reservoir. In some other implementations, a plurality of hydraulic pumps may be utilized in order to help pump the hydraulic oil into the third hydraulic hose 419 and/or the fourth hydraulic hose 421. Benefits from utilizing the plurality of hydraulic pumps may include, but are not limited to, providing an operator with a means of easily controlling and/or adjusting the efficiency of the disclosed vertical axis turbine 100.

In some alternative implementations, a self-adjusting mechanism 422 may be used to help adjust the efficiency of the vertical axis turbine 100 based on the speed of wind blowing in the environment of the vertical axis turbine 100. To provide additional clarity to the reader regarding the implementations disclosed herein, additional details of the self-adjusting mechanism 318 are now provided with respect to the FIG. 6.

Figure 6:
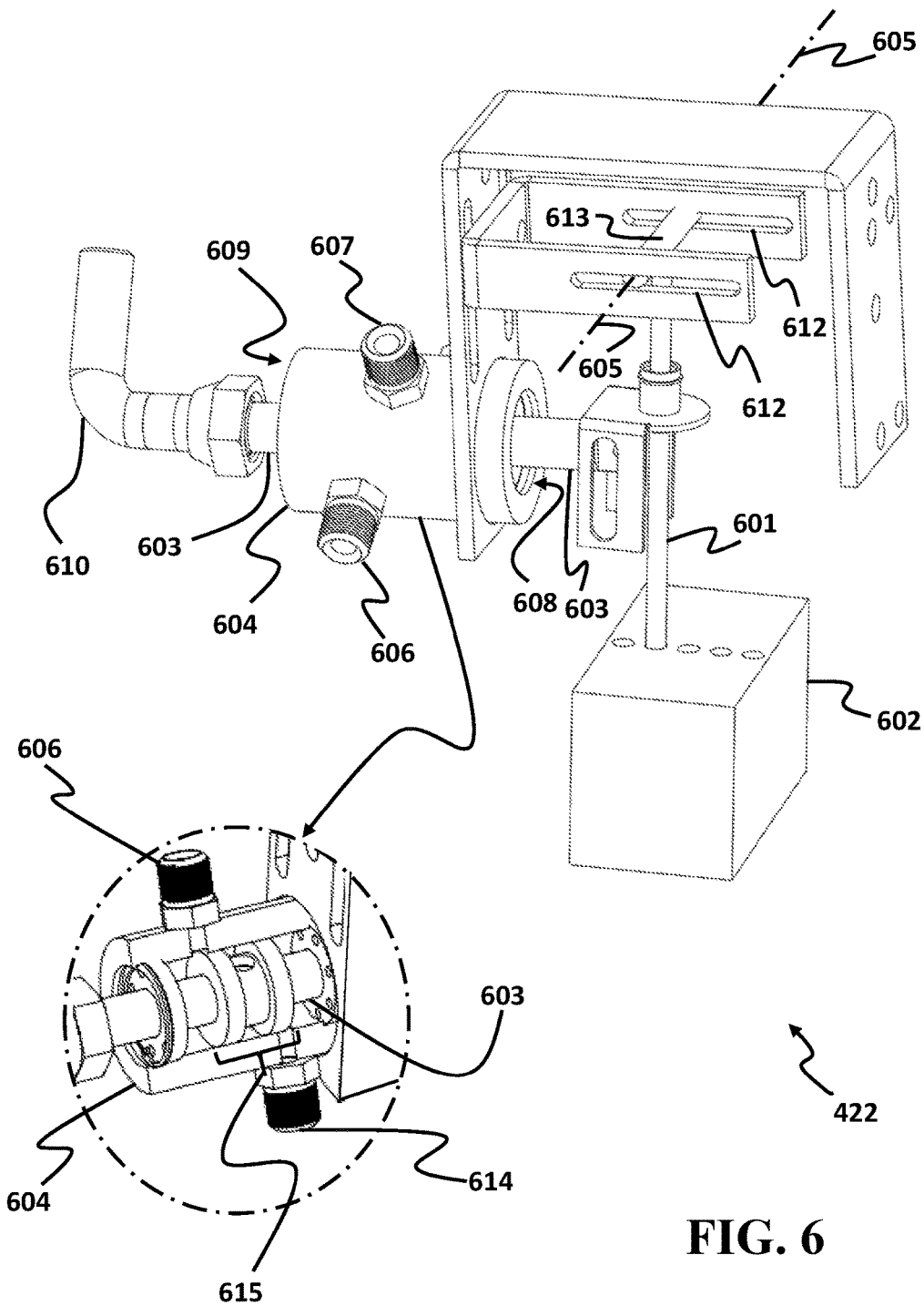
FIG. 6 illustrates a sectional view of an implementation of a self-adjusting mechanism.

Referring now to FIG. 6, in one implementation, the self-adjusting mechanism 422 may include a pendulum rod 601, a mass 602, a spool-type piston 603, and a cylinder 604. In some implementations, a proximal end of the pendulum rod 601 may be disposed slidably between two slots 612. The mass 602 may be mounted or otherwise attached to a distal end of the pendulum rod 601. Furthermore, the spool-type piston 603 may be mounted or otherwise attached to the pendulum rod 601 in a configuration such that rotational movement of the pendulum rod 601 about the third axis 605 urges translational movement of the spool-type piston 603 inside the cylinder 604. For example, the spool-type piston 503 may be mounted or otherwise attached to the pendulum rod 601 through a pin mechanism or any of various similar or equivalent mechanisms. For purpose of reference, it should be understood that, in some implementations, the third axis 605 may be substantially fixed to a horizontal rod 613 that can be provided at the proximal end of the pendulum rod 601. In some implementations, to help in actuating the second hydraulic jack 417, a first port 606, a second port 607, and a third port 614 may be provided at the exterior surface of the cylinder 604. In some implementations, the spool-type piston 603 may include a hollow rod section that may be in fluid communication with a hydraulic oil reservoir through a connector 610. In an aspect, the cylinder 604, the spool-type piston 603, the first port 606, the second port 607, and the third port 614 may be configured such that hydraulic oil is pumped into the rod end 420 of the second hydraulic jack 417 and consequently urges the second piston 416 to retract, responsive to the spool-type piston 603 being moved toward the distal end 608 of the cylinder 604; and similarly the hydraulic oil is pumped into the cap end 418 of the second hydraulic jack 417 and consequently urges the second piston 416 to expand, responsive to the spool-type piston 603 being moved toward the proximal end 609 of the cylinder 604.

Referring to FIG. 6, the hydraulic oil may be discharged to the hydraulic oil reservoir through the second port 607 responsive to the spool-type piston 603 being placed neither in the proximal end 609 of the cylinder 604 nor in the distal end 608 of the cylinder 604. In one implementation, the spool-type piston 603 may include a spool section 615. In some implementations, the cylinder 604 and the spool-type piston 603 may be configured in a way such that hydraulic oil leakage from the spool section 615 to the cylinder 604 is minimized or prevented. And also the spool section 615 may be in fluid communication with the hydraulic oil reservoir through the connector 610. According to the breakout section view of the cylinder 604 shown in FIG. 6, it should be understood that the hydraulic oil may be pumped out from the first port 606 into the rod end 420 of the second hydraulic jack 417 through the fourth hydraulic hose 421, responsive to the spool section 615 being secured or otherwise placed in front of the first port 606. Similarly, the hydraulic oil may be pumped out from the third port 608 into the cap end 418 of the second hydraulic jack 417 through the third hydraulic hose 419, responsive to the spool section 615 being secured or otherwise placed in front of the third port 608. And also, the hydraulic oil may be pumped out from the second port 607 and consequently be discharged to the hydraulic oil reservoir, in a response to the spool section 615 being secured or otherwise placed in front of the second port 607.

In some implementation of the present disclosure, the pendulum rod 601 and the mass 602 may be configured such that responsive to faster rotation of the vertical axis turbine 100 relative to a reference rotational speed, due to the corresponding centrifugal force acting on the mass 602, the pendulum rod 601 may rotate about the third axis 605 in a direction that the mass 602 is moved away from the cylinder 604. This, in turn, urges the spool-type piston 603 outward toward the distal end 608 of the cylinder 604, and as described above, when the spool-type piston 603 is toward the distal end of the cylinder 604, hydraulic oil is pumped into the rod end 420 of the second hydraulic jack 417. This urges the second piston 416 to retract and, acting through the second rack 415, such retraction can adjust and/or alter rotational position of the exterior compartment 502 about the upper axis 406 in a direction decreasing the efficiency of the vertical axis turbine 100. Similarly, when a slower rotation of the vertical axis turbine 100 relative to the reference rotational speed sufficiently reduces the centrifugal force acting on the mass 602, the pendulum rod 601 may rotate about the third axis 605 in a direction that the mass 602 is moved toward the cylinder 604, which can urge the spool-type piston 603 inward toward the proximal end 609 of the cylinder 604. As described above, when the spool-type piston 603 is toward the proximal end 609 of the cylinder 604, hydraulic oil is pumped into the cap end 418 of the second hydraulic jack 417. This urges the second piston 416 to expand and, acting through the second rack 415, such expansion can adjust and/or alter rotational position of the exterior compartment 502 about the upper axis 406 in a direction increasing the efficiency of the vertical axis turbine 100.

According to above explanations and above-described mechanisms, it should be understood that when the rotational speed of the vertical axis turbine 100 passes a rotational speed threshold, the self-adjusting mechanism 422 may decrease the vertical axis turbine 100 rotational speed through decreasing the efficiency of the vertical axis turbine 100 until the rotational speed of the vertical axis turbine 100 reaches the reference rotational speed. Once the rotational speed of the vertical axis turbine 100 reaches the reference rotational speed, the self-adjusting mechanism 422 may maintain the vertical axis turbine 100 rotational speed through maintaining the efficiency of the vertical axis turbine 100. Similarly, when rotational speed of the vertical axis turbine 100 is less than the reference rotational speed, the self-adjusting mechanism 422 may increase the vertical axis turbine 100 rotational speed through increasing the efficiency of the vertical axis turbine 100.

While the foregoing has described what are considered to be the best mode and/or other examples, it is understood that various modifications may be made therein and that subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A vertical axis turbine, comprising:
a rotor shaft, the rotor shaft being vertically oriented;
a plurality of radially extended arms rotatably mounted on the rotor shaft, each radially extended arm having an end distal from the rotor shaft;
a plurality of chassis, each of the chassis being attached to the distal end of a respective one of the radially extended arms;
mounted on an upper portion of each chassis, a corresponding upper blade set including a plurality of upper blade panels and an upper guide link pivotally coupled to the plurality of upper blade panels, each of the upper blade panels including an upper panel first edge and an opposing upper panel second edge, each of the plurality of upper blade panels being pivotally mounted on the chassis from the upper panel first edge and being rotatable between a closed position and an open position around a pivotal axis defined by the upper panel first edge, the plurality of the upper blade panels being interconnected pivotally from the upper panel second edge by the upper guide link;
mounted on a lower portion of each chassis, a corresponding lower blade set including a plurality of lower blade panels and a lower guide link pivotally coupled to the plurality of lower blade panels, each of the lower blade panels including a lower panel first edge and an opposing lower panel second edge, each of the plurality of lower blade panels being pivotally mounted on the chassis from the lower panel first edge and being rotatable between a closed position and an open position around a pivotal axis defined by the lower panel first edge, the plurality of the lower blade panels being interconnected pivotally from the lower panel second edge by the lower guide link;
associated with each chassis, an upper shaft coupled with the upper guide link, and an upper gear mounted on and rotatable with the upper shaft, the coupling being configured such that an upward or downward movement of the upper guide link couples to and urges a rotation of the upper shaft about the longitudinal axis of the upper shaft; and
associated with each chassis, a lower shaft coupled with the lower guide link, and a lower gear mounted on and rotatable with the lower shaft, the coupling being configured such that an upward or downward movement of the lower guide link couples to and urges a rotation of the lower shaft about the longitudinal axis of the lower shaft, the lower shaft including a lower gear mounted thereon and rotatable therewith;
wherein, the upper gear and the lower gear mesh with one another.

2. The vertical axis turbine of claim 1, wherein:
the upper guide link is a first of two parallel upper guide links, each of the two parallel upper guide links being pivotally coupled to the respective upper panel second edge of each of the plurality of upper blade panels,
the upper link is a first upper link among two upper links, and
the upper shaft is coupled with the two upper guide links via two upper links.

3. The vertical axis turbine of claim 2, wherein:
the lower guide link is a first of two parallel lower guide links, each of the two parallel lower guide links being pivotally coupled to the respective lower panel second edge of each of the plurality of lower blade panels,
the lower link is a first lower link among two lower links, and
the lower shaft is coupled with the lower guide link via two lower links.

4. The vertical axis turbine according to claim 1, further comprising:
a first hydraulic jack, including a first piston disposed inside a first cylinder, the first cylinder including an inlet path and a discharge path;
a first rack, coupled to the first piston, and interposed meshably between the upper gear and the lower gear, in a configuration such that rotational movements of the upper gear and the lower gear in respective first and second rotational directions urge respective back and forth translational movements of the first rack; and
a control valve within the discharge path, wherein the control valve is configured to control an amount of hydraulic oil discharged from the first hydraulic jack.

5. The vertical axis turbine of claim 4, wherein the control valve comprises:
an interior compartment rotatably coupled with the upper shaft, the interior compartment including a first plurality of holes;
an exterior compartment including a second plurality of holes, the interior compartment being disposed coaxially within the exterior compartment; and
a set gear rotatably coupled to the exterior compartment, wherein:
an alignment of holes among the first plurality of holes with holes among the second plurality of holes establishes a corresponding fluid communication path between the exterior compartment and the interior compartment,
rotation of the exterior compartment relative to the interior compartment changes a number of the first plurality of holes and the second plurality of holes placed in alignment with one another,
the first plurality of holes and the second plurality of holes are configured such that changing the number of the first plurality of holes and the second plurality of holes in alignment with one another changes the fluid communication path in a manner that changes a rate of hydraulic oil communication between the exterior compartment and the interior compartment, and
a rotation of the set gear urges a corresponding rotation of the exterior compartment relative to the interior compartment, correspondingly changing the number of the first plurality of holes and the second plurality of holes in alignment with one another.

6. The vertical wind turbine according to claim 5, further comprising a self-adjusting mechanism mounted on each of the chassis, each of the self-adjusting mechanisms comprising:
a pendulum mechanism that includes a pendulum rod having a pendulum rod distal end and a mass attached to the pendulum rod distal end;
a second cylinder and a spool-type piston disposed within the second cylinder, the second cylinder having a cylinder proximal end and a cylinder distal end, and includes a first port, a second port, and a third port, the first port being in fluid communication with a hydraulic oil reservoir, and the spool-type piston being coupled with the pendulum rod, wherein a position of the spool-type piston within the second cylinder correspondingly controls a distribution of hydraulic oil received from the first port into the second port and the third port; and
a second hydraulic jack, having a cap side, a rod end, and a second piston, the second hydraulic jack being in fluid communication with the second port and the third port of the second cylinder, the second port being in fluid communication with the cap side of the second hydraulic jack, the third port in fluid communication with the rod end of the second hydraulic jack, and the second piston being coupled with the set screw via a second rack, wherein:
a movement of the pendulum rod responsive to the mass moving relative to the second cylinder under the centrifugal force exerted on the mass due to the rotational movement of the vertically oriented rotor shaft urges a corresponding movement in the position of the spool-type piston,
responsive to hydraulic oil being discharged from the second port into the cap end of the second hydraulic jack, the second piston moves forth and rotates the set screw in a first direction, correspondingly increasing the number of the first plurality of holes and the second plurality of holes in alignment with one another, and
responsive to hydraulic oil being discharged from the third port into the rod end of the second hydraulic jack, the second piston moves back and rotates the set screw in a second direction, correspondingly decreasing the number of the first plurality of holes and the second plurality of holes in alignment with one another.

7. The vertical wind turbine according to claim 6, wherein:
the pendulum rod, the mass, and the coupling of the spool-type piston to the pendulum rod are configured such that when a rotational speed of the rotor axis exceeds a reference, a centrifugal force on the mass urges the pendulum rod to a position that urges the spool-type piston toward the cylinder distal end, and
the spool-type piston, the first port, the second port, and the third port are configured such that when the spool-type piston is toward the cylinder distal end, hydraulic oil is pumped through the third port into the rod end of the second hydraulic jack, sufficient to move the second piston forth and rotate the set screw in the first direction.

8. The vertical wind turbine according to claim 7, wherein:
the pendulum rod, the mass, and the coupling of the spool-type piston to the pendulum rod are configured such that when a rotational speed of the rotor axis reduces to less than the reference, the centrifugal force on the mass reduces, and the pendulum rod moves to a position that urges the spool-type piston toward the cylinder proximal end, and
the spool-type piston, the first port, the second port, and the third port are configured such that when the spool-type piston is toward the cylinder proximal end, hydraulic oil is pumped through the second port into the cap side of the second hydraulic jack, sufficient to move the second piston back and rotate the set screw in the second direction.

9. The vertical wind turbine according to claim 1, wherein each of the plurality of upper blade panels pivots about the pivotal axis defined by the upper panel first edge to a closed position responsive to wind flowing toward the upper panel second edge.

10. The vertical wind turbine according to claim 1, wherein each of the plurality of lower blade panels pivots about the pivotal axis defined by the lower panel first edge to a closed position responsive to wind flowing toward the lower panel second edge.

11. A wind turbine, comprising:
a rotor shaft, the rotor shaft having an axis;
a radially extended arm, movably supported by the rotor shaft, having an end proximal to the rotor shaft and having a distal end, the movable support being configured such that the distal end is movable about the axis;
a chassis attached to the distal end of the radially extended arm, the chassis having an upper portion and a lower portion;
an upper blade panel, having an upper panel first edge and an opposing upper panel second edge, the upper blade panel pivotally mounted on the upper portion of the chassis from the upper panel first edge and being rotatable between a closed position and an open position around a pivotal axis defined by the upper panel first edge;

an upper guide link pivotally coupled to the upper panel second edge;

a lower blade panel, having a lower panel first edge and an opposing lower panel second edge, the lower blade panel being pivotally mounted on the lower portion of the chassis from the lower panel first edge and being rotatable between a closed position and an open position around a pivotal axis defined by the lower panel first edge;

an upper shaft coupled to the upper guide link in a configuration wherein a movement of upper guide link couples with a rotation of the upper shaft;

a lower shaft coupled to the lower guide link, in a configuration wherein a movement of the lower guide link urges a rotation of the lower shaft; and a coupling between the upper shaft and the lower shaft, the coupling being configured to mutually couple rotation of the upper shaft and lower shaft.

12. The wind turbine of claim 11, wherein the coupling between the upper shaft and the lower shaft includes an upper shaft gear coupled to the upper shaft and a lower shaft gear that is coupled to the lower shaft and is in a geared coupling with the upper shaft gear.

13. The wind turbine of claim 11, wherein:
the upper blade panel is a first upper blade panel among a plurality of upper blade panels, and the lower blade panel is a first lower blade panel among a plurality of lower blade panels, each of the upper blade panels includes a respective upper panel first edge and an opposing upper panel second edge, each of the upper blade panels is pivotally mounted on the upper portion of the chassis from its respective first edge and is rotatable between a closed position and an open position that correspond, respectively, to the closed position and open position of the first upper blade panel, the upper guide link is pivotally coupled to the upper panel second edge of each of the upper blade panels, and the lower guide link is pivotally coupled to the lower panel second edge of each of the lower blade panels.

14. The wind turbine of claim 11, wherein:
the radially extended arm is a first radially extended arm among a plurality of radially extending arms, each of the radially extending arms being movably supported by the rotor shaft, having an end proximal to the rotor shaft and having a distal end, the movable support being configured such that the distal end is movable circumferentially about the axis, and the chassis is a first chassis among a plurality of chassis, each of the chassis attached to the distal end of the radially extended arm, and each having an upper portion and a lower portion.

15. The wind turbine of claim 14, wherein the wind turbine further comprises:
pivotally mounted on the upper portion of each of the chassis, a corresponding upper blade panel, having an upper panel first edge and an opposing upper panel second edge, the upper blade panel pivotally mounted on the upper portion of the chassis from the upper panel first edge and being rotatable between a closed position and an open position around a pivotal axis defined by the upper panel first edge;

pivotally mounted on the lower portion of each of the chassis, a corresponding lower blade panel, having a lower panel first edge and an opposing lower panel second edge, the lower blade panel pivotally mounted on the lower portion of the chassis from the lower panel first edge and being rotatable between a closed position and an open position around a pivotal axis defined by the lower panel first edge, and associated with each of the chassis,
an upper guide link pivotally coupled to the upper panel second edge of the upper blade panel upper pivotally mounted on the upper portion of said chassis, a lower guide link pivotally coupled to the lower panel second edge of the lower blade panel upper pivotally mounted on the lower portion of said chassis, an upper shaft coupled to the upper guide link in a configuration wherein a movement of the upper guide link couples with a rotation of the upper shaft, a lower shaft coupled to the lower guide link, in a configuration wherein a movement of the lower guide link urges a rotation of the lower shaft, and a coupling between the upper shaft and the lower shaft, the coupling being configured to mutually couple rotation of the upper shaft and lower shaft.

* * * * *